Figure 1:
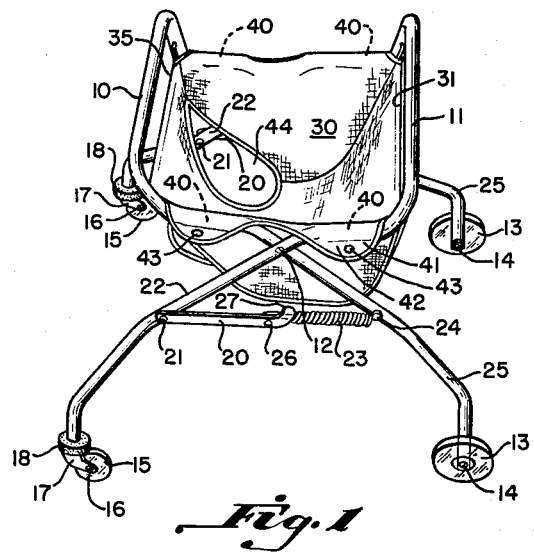

March 26, 1963     D. W. GILL     3,083,050
ROLLABLE BABY JUMP SEAT

Filed May 16, 1960     3 Sheets-Sheet 1

INVENTOR.
Donald W. Gill.
BY Wood, Herron & Evans
ATTORNEYS.

March 26, 1963 D. W. GILL 3,083,050
ROLLABLE BABY JUMP SEAT
Filed May 16, 1960 3 Sheets-Sheet 2

INVENTOR.
Donald W. Gill.
BY
Wood, Herron & Evans
ATTORNEYS.

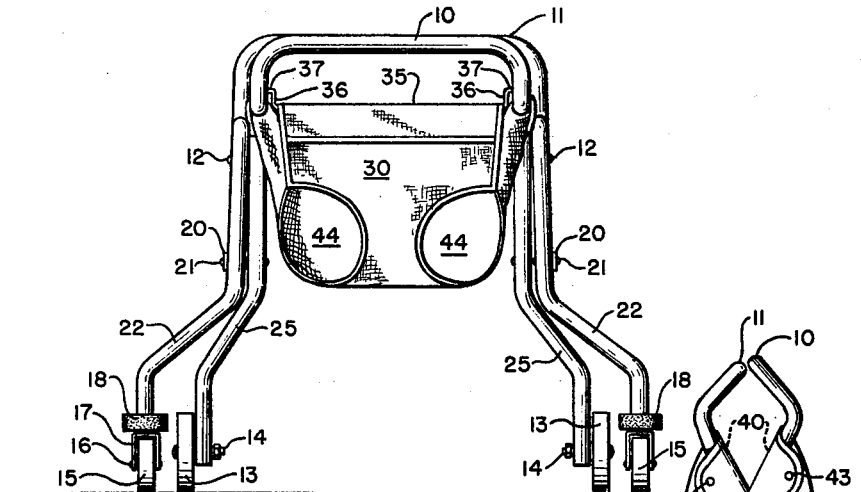
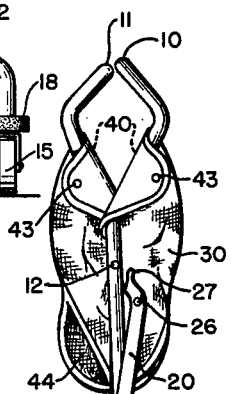
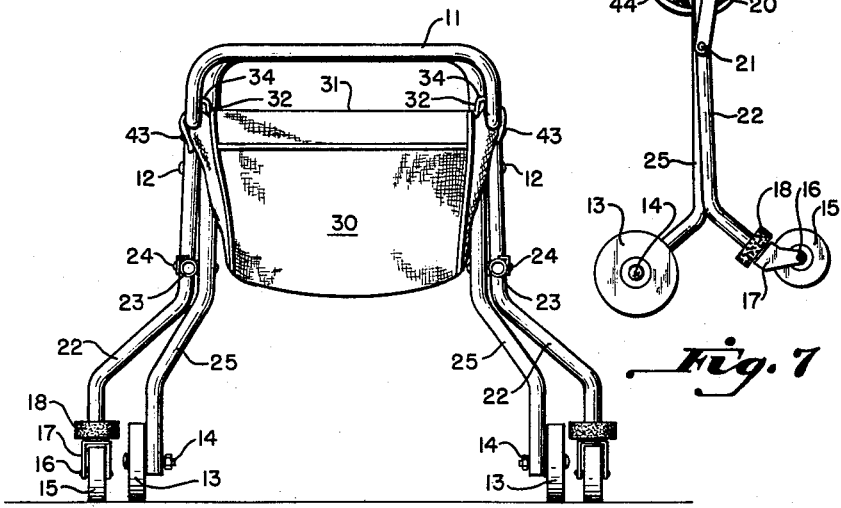

United States Patent Office 3,083,050
Patented Mar. 26, 1963

3,083,050
ROLLABLE BABY JUMP SEAT
Donald W. Gill, Cincinnati, Ohio, assignor to The Frank
F. Taylor Company, Cincinnati, Ohio, a corporation of
Ohio
Filed May 16, 1960, Ser. No. 29,221
2 Claims. (Cl. 297—16)

This invention relates to a baby jumper, and more particularly, the invention relates to a resiliently supported seat for a child, the support having wheels by which it may be propelled along a surface.

Broadly, the invention is directed to providing a device in which a small child can be seated and can be kept amused through his own exertions. Further, the invention is directed to such a device which may be easily pushed or pulled from one location to another so that, for example, a mother working around the house can constantly tend her child by pulling the child along with her as she works in various parts of the house.

To this end, the objective of the invention is to provide a very simple sturdy structure which serves as a baby jump seat, a walker by which a child may propel himself and a seat which can conveniently be rolled from place to place.

The principal structural members include two frame members crossing each other and pivotally joined in scissors fashion, a seat supported from the upper ends of the frame members, wheels mounted on the lower ends of the frame members and a resilient interconnection of the frame members. The resilient interconnection of the frame members permits the frame members to pivot with respect to each other and thereby to change their angular relationship to one another and, in so doing, provides a resilient or jumper action. As the frame members change their angular relationship, the lower ends of the frame members move toward and away from each other. This action is facilitated by the wheels at the lower ends of the frame members.

The wheels not only provide an anti-friction engagement of the device with a supporting surface for facilitating the jumper action, but additionally the wheels permit the device to be rolled conveniently from place to place. Further facilitating the rolling of the device, including turning corners and the like, is the employment of caster mountings for the front wheels.

Another objective of the invention has been to provide a device of the type described above in which the seat is connected on supports which can swing relative to the frame members, thereby permitting the unhampered pivoting of the frame members with respect to each other.

It has been an objective of the invention to provide a baby jumper which may be easily collapsed for storage. To this end, the baby jumper includes a resilient interconnection of the frame members which permits the frame members to be moved between a supported position in which there is a wide angle between frame members and a collapsed position in which the frame members are brought close to parallel alignment.

Figure 2:
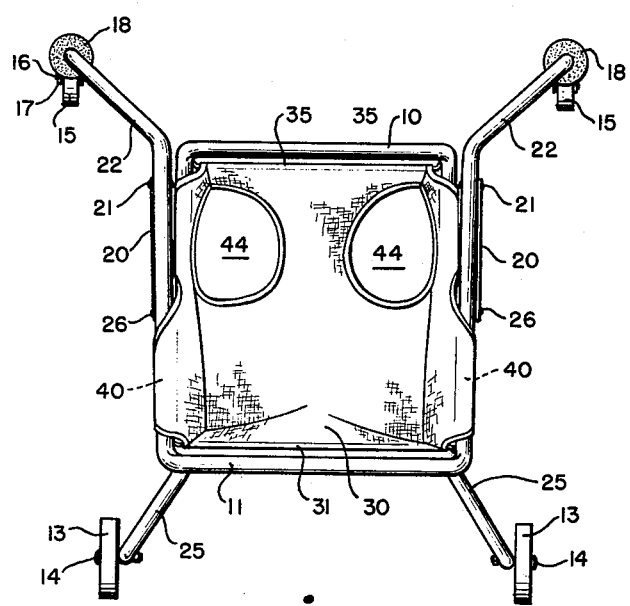
Figure 3:
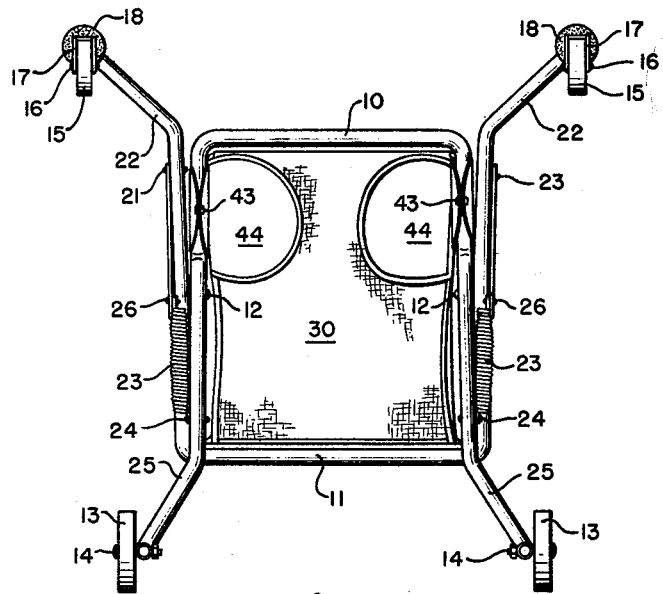
Figure 4:
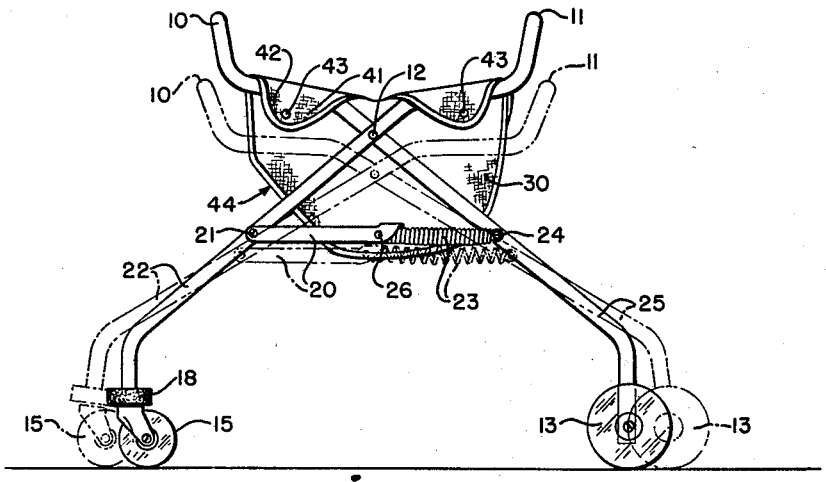

These and other objectives of the invention will become more readily apparent from the following detailed description taken in conjunction with the accompanying drawings in which:

FIG. 1 is a perspective view of the invention;
FIG. 2 is a top plan view thereof;
FIG. 3 is a bottom plan view thereof;
FIG. 4 is a side elevational view thereof;
FIG. 5 is a front elevational view thereof;
FIG. 6 is a rear elevational view thereof; and
FIG. 7 is a side elevational view showing the device in collapsed position.

The jumper of the present invention has as its two main structural support elements an inside U-shaped member 10 and an outside U-shaped member 11. The members cross each other and are pivoted at 12 to provide a scissors-like action. The U-shaped member 10 has a pair of nylon wheels 13 journaled at 14 to the lower ends of the frame member. The outside frame member 11 has at the lower ends thereof a pair of nylon wheels 15 rotatably mounted at 16 in swivel casters 17. Small circular bumpers 18 are also situated on the lower ends of frame member 11.

A link 20 is pivoted at 21 on each leg 22 of frame member 11. Similarly, a helically coiled tension spring 23 is pivotally connected at 24 to each leg 25 of frame member 10. The spring 23 is pivotally connected at 26 to the free end portion of the link 20. The link 20 is terminated in a tab 27 bent at right angles to the plane of the link and overlying the spring 23 to maintain the spring and link in a substantially straight line when the jumper is in its erect position.

The jumper is provided with a seat 30 fastened along its rear upper edge 31 to a U-shaped rod 32 (best illustrated in FIG. 6), the U-shaped rod 32 being pivoted at its ends 34 to the frame member 11. Similarly, the upper front edge 35 of the seat is suspended on a U-shaped rod 36 (FIG. 5), the U-shaped rod 36 having its ends 37 pivoted in frame member 10. The rods 32 and 36 permit the front and back portions of the seat to swing freely with respect to the frame members. While a fabric seat is illustrated in the drawings, it should be understood that other seat constructions may be employed without departing from the scope of the invention.

Each leg 22 and 25 of both frame members has a generally horizontal section 40 in the upper portion of the legs, the horizontal section forming a support for the sides of the seat. Each side of the seat has an upper edge portion 41 formed as two flaps 42 which are folded over the horizontal sections 40 of the legs 22 and 24. Snaps 43 are provided on the ends of the flaps 42 and have cooperating snap members on the sides of the seat to permit the flaps 42 to be snapped into the position overlying the horizontal leg sections 40. The front and bottom portion of the seat 30 is provided with leg holes 44.

In operation, a child is seated within the seat 30 supported as described above, the child having his legs projecting through the holes or opening 44. When the child jumps up and down in the seat, the frame members 11 pivot with respect to each other, this change of the angular relationship being resiliently resisted by the springs 23. The change in the angular relationship is effective to cause the seat to bounce up and down.

The child can, by pushing his feet against the surface upon which the jumper is mounted, propel the jumper forward or backward, or even in circles, because of the castered wheels. It can be appreciated that any person standing alongside the jumper can, by conveniently grasping the bight portion of either of the frame members, pull or push the jumper to roll it from one location to another.

When the jumper is not in use, it can be collapsed merely by pulling in an upward direction on links 20. Pulling in an upward direction on links 20 will cause the wheels and bight portions of the frame member to draw together until the jumper is collapsed as illustrated in FIG. 7. In the collapsed position of FIG. 7, it will be observed that the jumper occupies very little space for storage purposes.

Having described my invention, I claim:
1. A baby jumper comprising, two U-shaped frame members each having an upper bight portion and downwardly directed leg portions, said members being pivotally joined intermediate the ends of adjacent leg portions in scissors fashion, resilient means interconnecting said frame members below the intersection of said frame members, a U-shaped seat support rod pivotally suspended at the upper end of each frame member, each leg of said frame members having a generally horizontal section between the bight portion and intersection of said frame members, a seat suspended between said frame members, the upper front and rear edges of said seat joined to said rods, and the upper side edges of said seat being supported by said horizontal leg sections.

2. A baby jumper comprising, two U-shaped frame members each having an upper bight portion and downwardly directed leg portions, said members being pivotally joined intermediate the ends of adjacent leg portions in scissors fashion, resilient means interconnecting said frame members below the intersection of said frame members, each leg of said frame members having a generally horizontal section between the bight portion and intersection of said frame members, a seat suspended between said frame members, and the upper side edges of said seat being supported by said horizontal leg sections.

References Cited in the file of this patent
UNITED STATES PATENTS

| | | |
|---|---|---|
| 1,708,632 | Podiebrad | Apr. 9, 1929 |
| 1,847,992 | Upper | Mar. 1, 1932 |
| 2,015,974 | Stannard | Oct. 1, 1935 |
| 2,616,718 | Heideman | Nov. 4, 1952 |
| 2,788,054 | Erickson | Apr. 9, 1957 |
| 2,790,486 | Hardie | Apr. 30, 1957 |

FOREIGN PATENTS

| | | |
|---|---|---|
| 218,494 | Great Britain | July 10, 1924 |